United States Patent
Kalhan et al.

(10) Patent No.: US 10,361,769 B2
(45) Date of Patent: Jul. 23, 2019

(54) PARTIAL DECODE AND FORWARD (PDF) SIGNAL FORWARDING DEVICE WITH SCHEDULER

(71) Applicants: Kyocera Corporation, Kyoto (JP);
Amit Kalhan, San Diego, CA (US);
Henry Chang, San Diego, CA (US)

(72) Inventors: Amit Kalhan, San Diego, CA (US);
Henry Chang, San Diego, CA (US)

(73) Assignee: Kyocera Corporation, Kyoto (JP)

( * ) Notice: Subject to any disclaimer, the term of this patent is extended or adjusted under 35 U.S.C. 154(b) by 0 days.

(21) Appl. No.: 15/772,257

(22) PCT Filed: Nov. 17, 2016

(86) PCT No.: PCT/US2016/062442
§ 371 (c)(1),
(2) Date: Apr. 30, 2018

(87) PCT Pub. No.: WO2017/087616
PCT Pub. Date: May 26, 2017

(65) Prior Publication Data
US 2018/0323861 A1    Nov. 8, 2018

Related U.S. Application Data

(60) Provisional application No. 62/257,000, filed on Nov. 18, 2015.

(51) Int. Cl.
*H04B 7/155* (2006.01)
*H04L 1/00* (2006.01)
*H04B 7/0426* (2017.01)

(52) U.S. Cl.
CPC ....... *H04B 7/15542* (2013.01); *H04B 7/0426* (2013.01); *H04B 7/15557* (2013.01); *H04L 1/0038* (2013.01); *H04L 1/0046* (2013.01)

(58) Field of Classification Search
CPC .............. H04B 7/15542; H04B 7/0426; H04B 7/15557; H04L 1/0038; H04L 1/0046;
(Continued)

(56) References Cited

U.S. PATENT DOCUMENTS

2005/0232183 A1* 10/2005 Sartori ............... H04B 7/15542
370/319
2009/0201874 A1* 8/2009 Okuda ................. G01S 5/0018
370/329

(Continued)

*Primary Examiner* — Sophia Vlahos

(57) ABSTRACT

A signal forwarding device forwards signals between a user equipment (UE) device and a base station using a partial decode and forward (PDF) signal forwarding scheme where an incoming signal is demodulated and forwarded to a destination as a forwarded signal without decoding the incoming signal. The signal forwarding device transmits, to the base station, channel information regarding the UE-SFD channel between the UE device and the signal forwarding device. A base station (BS) scheduler determines the coding rate to be used by the UE device at least partially based on the channel information. The base station transmits coding rate information indicative of the coding rate to the signal forwarding device. A signal forwarding device (SFD) scheduler schedules communication resources for use by the UE device at least partially based on the coding rate information.

19 Claims, 4 Drawing Sheets

(58) Field of Classification Search
CPC ........ H04L 2001/0097; H04W 84/047; H04W 28/06; H04W 72/0406; H04W 72/042; H04W 88/04

See application file for complete search history.

(56) References Cited

U.S. PATENT DOCUMENTS

| | | |
|---|---|---|
| 2010/0008284 A1* | 1/2010 | Chae .................... H04B 7/2606 370/315 |
| 2010/0029285 A1* | 2/2010 | Horiuchi ............ H04B 7/15542 455/445 |
| 2011/0269393 A1 | 11/2011 | Ostergaard et al. |
| 2012/0008546 A1 | 1/2012 | Yokoyama et al. |
| 2013/0051254 A1 | 2/2013 | Wilhelmsson et al. |
| 2014/0016591 A1 | 1/2014 | Kim et al. |
| 2014/0334331 A1 | 11/2014 | Wager et al. |

\* cited by examiner

PARTIAL DECODE AND FORWARD (PDF) SIGNAL FORWARDING DEVICE WITH SCHEDULER

CLAIM OF PRIORITY

The present application claims priority to Provisional Application No. 62/257,000, entitled "METHOD FOR DETERMINING THE CODE RATE FOR THE COMBINED UE-TO-RELAY AND RELAY-TO-ANCHOR ENB CHANNELS," filed Nov. 18, 2015, assigned to the assignee hereof and hereby expressly incorporated by reference in its entirety.

FIELD

This invention generally relates to wireless communications and more particularly to signal forwarding devices having a scheduler and using partial decode and forward (PDF) signal forwarding schemes.

BACKGROUND

Some communication systems utilize a signal forwarding device, such as a repeater station, relay station or a self-backhauled station to facilitate the transfer of information between user equipment (UE) devices and a core network. The signal forwarding device is typically not connected directly to the core network but still provides service to the UE devices by forwarding information to and from the UE devices and a base station which is connected to the core network. Where the signal forwarding device is a repeater, the repeater simply retransmits downlink signals received from another base station to the UE device and retransmits uplink signals received from the UE device to the other base station. Although the repeater may apply limited signal processing to the incoming signal such as filtering, frequency shifting, and amplification, a repeater will not decode the incoming signal that is to be forwarded. Relay stations and self-backhaul stations perform at least some signal processing before retransmitting the information. Such processing can vary from partial decoding to complete decoding of the incoming signal. For example, the incoming signal can be completely decoded and used to generate a new signal or the incoming signal may not be completely decoded but still used to transmit the forwarded outgoing signal. Some of the various levels of processing (forwarding techniques) are sometimes referred to as amplify and forward (AF), partial decoding and forward (PDF) and decode and forward (DF) schemes.

SUMMARY

A signal forwarding device forwards signals between a user equipment (UE) device and a base station using a partial decode and forward (PDF) signal forwarding scheme where an incoming signal is demodulated and forwarded to a destination as a forwarded signal without decoding the incoming signal. The signal forwarding device transmits, to the base station, channel information regarding the UE-SFD channel between the UE device and the signal forwarding device. A base station (BS) scheduler determines the coding rate to be used by the UE device at least partially based on the channel information. The base station transmits coding rate information indicative of the coding rate to the signal forwarding device. A signal forwarding device (SFD) scheduler schedules communication resources for use by the UE device at least partially based on the coding rate information.

DETAILED DESCRIPTION

As discussed above, communication systems often employ repeaters, relays and self-anchored base stations to forward signals transmitted between base stations and the UE devices served by the base stations. Signals may be forwarded from the base station to the UE device, from the UE device to the base station or both. In conventional systems, scheduling of communication resources for the communication channel between the signal forwarding device (repeater, relay, etc.) and the UE device is performed by a scheduler at the base station or a central scheduler connected to the base station. In the examples discussed herein, however, a separate scheduler at, or connected to, the signal forwarding device performs at least some of the scheduling functions. In one example, the signal forwarding device (SFD) scheduler performs channel-aware rate-adaptation scheduling and multiple input multiple output (MIMO) transmission scheduling including time-frequency communication resource assignment, and determination of modulation order and transmission power.

In some situations, a base station scheduler or a central scheduler provides information that is used by the SFD scheduler to perform scheduling. The base station scheduler determines a coding rate to be used by the UE device and the signal forwarding device and the SFD scheduler uses the coding rate to determine other scheduling parameters. The base station scheduler may provide a pool of communication resources (e.g., time-frequency resources) from which the SFD scheduler schedules (assigns) resources to specific UE devices. The base station scheduler may forward other information such as the modulation order and transmission power to be used by the signal forwarding device when communicating with the base station, for example.

For the examples discussed herein, the base station controller determines the code rate based on the channel information related to the channel from the UE device, through the signal forwarding device, to the base station. The channel information may include the characteristics of the channel between the UE device and the signal forwarding device and the channel between the signaling forwarding device and the base station. An example of channel information includes a UE reference signal that is retransmitted by the signal forwarding device that can be used by the base station scheduler to select an appropriate code rate. Accordingly, the code rate for transmitting a signal from an origination device which is forwarded by a signal forwarding device and received by a destination device is determined by the destination device. At least some other scheduling parameters for the origination device transmissions, however, are determined by the signal forwarding device.

Figure 1A:
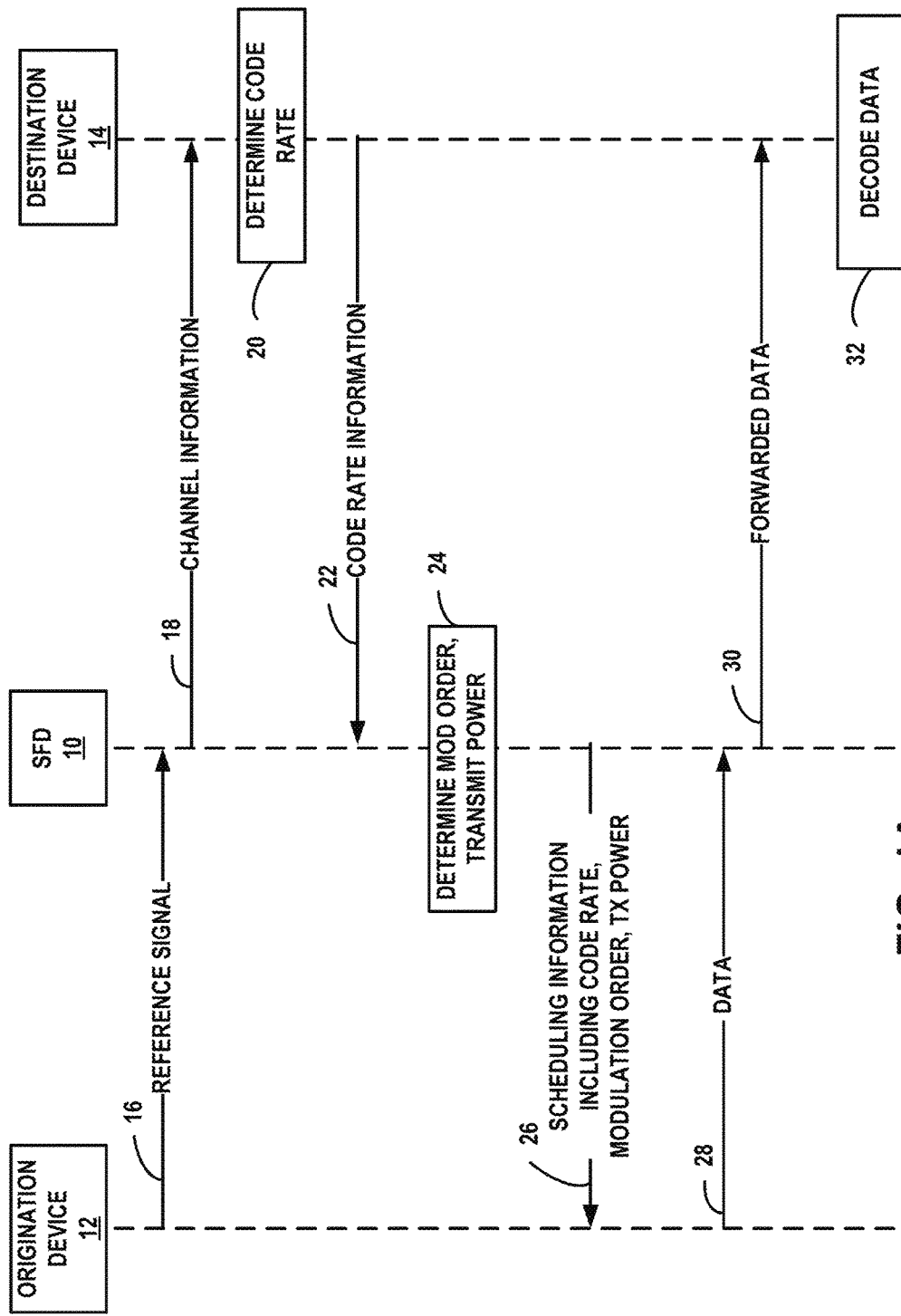
FIG. 1A is message diagram of an example where a signal forwarding device 10 forwards signals from an origination device to a destination device and where the code rate of the signal transmitted by the origination device is determined by the destination device and other scheduling parameters are determined by the signal forwarding device.

FIG. 1A is a message diagram of an example where a signal forwarding device 10 forwards signals from an origination device 12 to a destination device 14 and where the code rate of the signal transmitted by the origination device is determined by the destination device and other scheduling parameters are determined by the signal forwarding device 10. The origination device 12 and destination device 14 may be any kind of wireless communication devices and may be stationary or portable. For the examples discussed below with reference to FIG. 1B, FIG. 2, and FIG. 3, the destination device is a base station and the origination device is a user equipment (UE) device such as a handset. However, the devices 12, 14 may be different types of devices in other circumstances. For example, both devices may be UE devices. In some situations, the origination device, the signal forwarding device and the destination device are all UE devices.

The example of FIG. 1A begins with transmission 16 of a reference signal. The reference signal is received at the signal forwarding device and channel information based on the reference signal is transmitted to the destination device at transmission 18. The channel information pertains to the communication channel between the origination device and the signal forwarding device. In one example, the channel information includes signal measurements made by the signal forwarding device. In another example, as discussed below, the channel information is the reference signal retransmitted by the signal forwarding device as a retransmitted reference signal. In some situations, the channel information may also include information regarding the channel between the signal forwarding device and the destination device. A signal forwarding device (SFD) reference signal transmitted from the signal forwarding device is an example of a technique of providing such channel information. Based on at least the channel information, the code rate is determined at event 20. For the examples discussed herein, the code rate is determined based on the communication channel from the origination device, through the signal forwarding device, to the destination device. The code rate may be determined by the destination device or by a scheduler in communication with the destination device. For example, the destination device may forward channel information, as well as other information, to a scheduler where the scheduler determines the code rate based on the information. The scheduler may be an application running on equipment connected directly to the destination device or connected through a backhaul or other communication link. The code rate is transmitted from the destination device to the signal forwarding device in a code rate information transmission 22. As discussed below, an example of a code rate information transmission 22 is a grant message. At event 24, the scheduling parameters are determined based at least partially on the code rate. For the example, at least some of the scheduling parameters are also based on the channel conditions of the communication channel between the origination device and the signal forwarding device. At least the modulation order and transmission power that should be used by the origination device are determined in the example. Other scheduling parameters that may be determined include time-frequency communication resource identifiers, multiple input multiple output (MIMO) parameters, and other parameters related to channel aware rate-adaptation. At transmission 26, the scheduling information including at least the code rate, modulation order, and the transmission power that should be used by the origination device are sent to the origination device. Therefore, a scheduling control signal that indicates the communication resources scheduling parameters is transmitted to the UE device 106. At transmission 28, the data is transmitted using the scheduling information provided by the signal forwarding device. At transmission 30, the data is forwarded to the destination device. For the example, the signal forwarding device 10 demodulates without decoding the data signal transmission 28 received from origination device 12. The "clean" symbols of the data are then modulated and transmitted to the destination device 14. At event 32, the data is decoded at the destination device 14. Therefore, the coding rate used by the origination device 12 is determined by the destination device 14 while other scheduling parameters are determined by the signal forwarding device 10 and the data signals are decoded at the destination device 14. The signal forwarding device 10 performs demodulation and modulation to forward the data signals. As is known, demodulation includes extracting the symbols which represent the coded information from the carrier signal while decoding includes processing the coded data after demodulation to retrieve the data. As a result, decoding may require processing related to cyclic redundancy check (CRC) and turbo coding procedures. The scenario described with reference to FIG. 1A may be applied to various systems and system configurations. Some examples are discussed below.

Figure 1B:
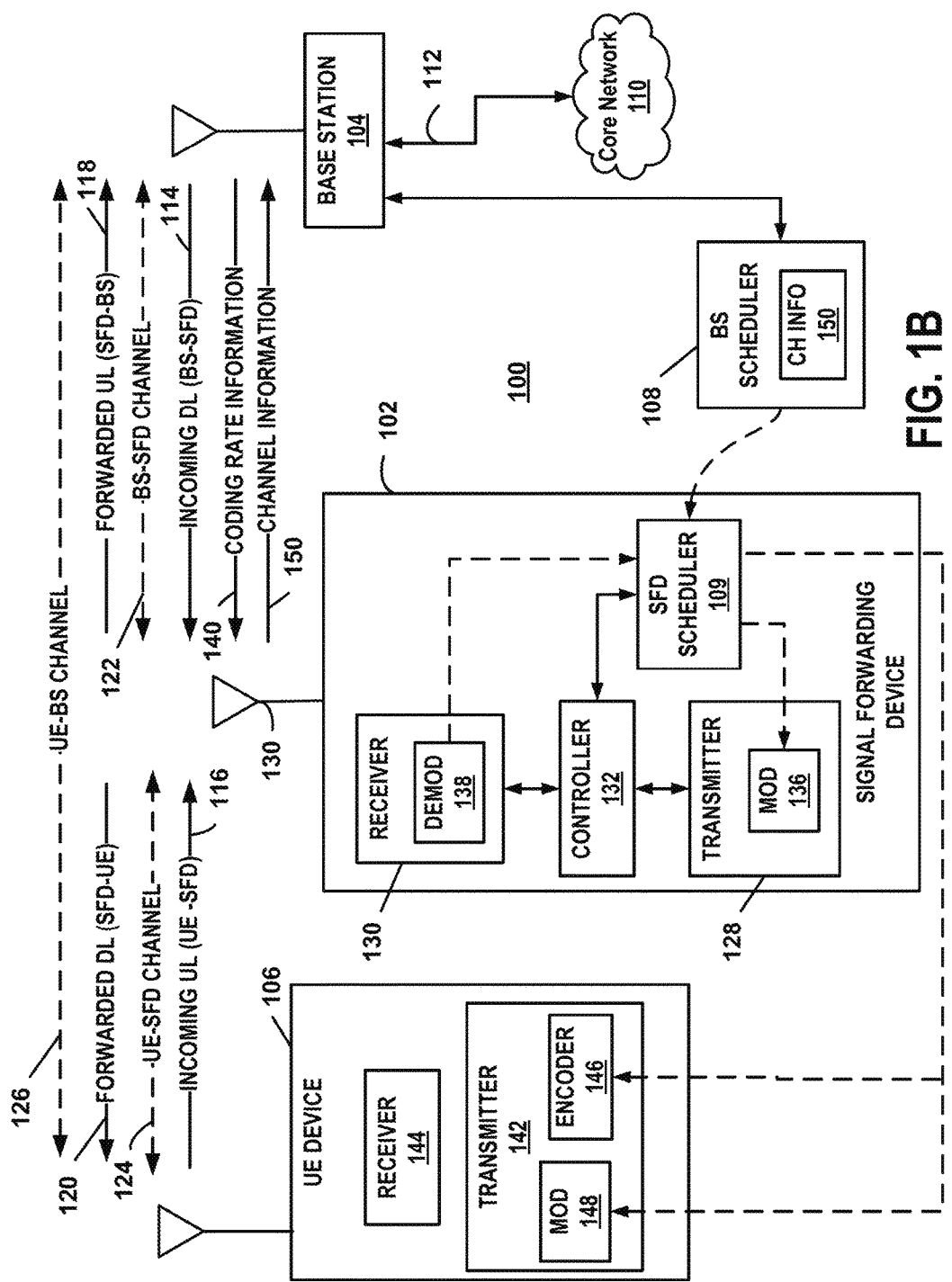
FIG. 1B is a block diagram of a wireless communication system including a signal forwarding device and a base station.

FIG. 1B is a block diagram of a wireless communication system 100 including a signal forwarding device 102 and a base station 104. The base station 104 provides wireless communication service to one or more user equipment (UE) devices 106 where the base station 104 exchanges wireless signals directly with the UE device 106 or through the signal forwarding device 102. A base station (BS) scheduler 108 assigns communication resources for serving the UE device 106 when the base station 104 is directly serving the UE device 106. For the examples discussed herein, however, the base station scheduler 108 only performs some of the scheduling functions when the UE device 106 is served through the signal forwarding device 102 and a separate signal forwarding device (SFD) scheduler 109 performs at least some of the scheduling functions. Accordingly, the system of FIG. 1B is an example of the scenario discussed with reference to FIG. 1A where the origination device 12 is a UE device 106, the destination device 14 is a base station 104, and the signal forwarding device 12 is a partial decode and forward (PDF) signal forwarding device 102.

The base station 104 is connected to a core network 110 through a backhaul 112 in accordance with known techniques. The BS scheduler 108 may be part of the base station 104 or may be connected to the base station 104, either directly or through the core network 110. Although other techniques may be used, the backhaul 112 is typically a wired backhaul that may include cabling, wires, fiber optic cables, and electronic equipment. Some other suitable backhaul techniques include wireless links such as microwave point-to-point links, optical laser links, and other wireless connections that may use standard or proprietary protocols.

The signal forwarding device 102 is any fixed, mobile, or portable equipment that preforms the functions described herein. For example, the signal forwarding device 102 may be a fixed device or apparatus that is installed at a particular location at the time of system deployment. Examples of such equipment include fixed base stations or fixed transceiver stations. In some situations, the signal forwarding device 102 may be mobile equipment that is temporarily installed at a particular location. Some examples of such equipment include mobile transceiver stations that may include power generating equipment such as electric generators, solar panels, and/or batteries. Larger and heavier versions of such equipment may be transported by trailer. In still other situations, the signal forwarding device 102 may be a portable device that is not fixed to any particular location. Accordingly, the signal forwarding device 102 may be a portable user device such as a UE device in some circumstances. In some implementations, the signal forwarding device 102 may be a base station, eNB, or access point that performs signal forwarding functions in addition to serving UE devices. For example, a self-backhauled eNB, connected to an anchor eNB, may be configured to perform signal forwarding functions for some UE devices in addition to directly serving other UE devices utilizing the wireless backhaul to the base station 104 (anchor eNB).

The base station 104 provides wireless communication service to one or more UE devices 106 by receiving uplink signals and transmitting downlink signals to the UE devices. For the example of FIG. 1B, the signal forwarding device 102 forwards the downlink signals 114 to the UE device 106 and forwards the uplink signals 116 to the base station 104. Therefore, the UE device 106 transmits an incoming UE uplink signal 116 that is received and forwarded by the signal forwarding device 102 as a forwarded uplink signal 118. The signal forwarding device 102 receives incoming downlink signals 114 transmitted by the base station 104 and forwards a forwarded downlink signal 120 to the UE device 106 that is based on the incoming downlink signal 114. The forwarded uplink signal 118 and the incoming downlink signal 114 are transmitted within a base-station-to-signal forwarding-device channel (BS-SFD channel) 122. For the examples discussed herein, the BS-SFD channel 122 is within a single frequency band although different sub-bands may be used for uplink and downlink directions. The forwarded downlink signal 120 and the incoming uplink signal 116 are transmitted within a UE-to-signal forwarding-device channel (UE-SFD channel) 124. For the example, the UE-SFD channel 124 is within a single frequency band although different sub-bands may be used for uplink and downlink directions. Any combination of frequency bands and frequency sub-bands may be used for the channels. In addition to the channels that link through the signal forwarding device 102, and under the appropriate conditions, the base station 104 can communicate with the UE device 106 directly through a direct channel 126 for uplink transmissions, downlink transmissions, or both. As a result, the signal forwarding device 102 may only forward signals in either the uplink or downlink direction in some situations.

The signal forwarding device 102 is capable of applying at least one type of partial decode and forwarding (PDF) signal forwarding scheme when forwarding an incoming signal. In some situations, the signal forwarding device may be capable of applying more than one type of signal forwarding scheme. The signal forwarding device, for example, may be able to apply at least one of an amplify and forward (AF) scheme, decode and forward (DF) scheme, and a PDF scheme. As discussed herein, a signal forwarding scheme is based on the parameters, techniques, and/or level of processing applied to the incoming signal to generate the forwarded signal. Signal forwarding schemes can be categorized into three basic groups. Repeater signal forwarding schemes generally include retransmission schemes where the incoming signal is received and retransmitted. At a minimum, the incoming signal is amplified and retransmitted as the forwarded signal. In some repeater schemes, some processing is applied to the incoming signal. For example, the incoming signal may also be filtered and/or frequency shifted. Generally, however, the incoming signal is not demodulated or decoded in a repeater signal forwarding scheme. Repeater schemes are sometimes referred to as amplify and forward (AF) schemes. Relay signal forwarding schemes include at least some decoding of the incoming signal to create the forwarded signal where the level of decoding can range from minimal to complete decoding of the incoming signal. Complete decoding includes fully decoding the incoming signal to extract the payload and then applying the decoded data to generate the new forwarded signal. Complete decoding schemes are sometimes referred to as decode and forward (DF) schemes. Several proposed techniques include partial decoding of the incoming signal to transmit a forwarded signal without complete decoding to extract the data from the signal. These schemes are sometimes referred to as partial decode and forward (PDF) schemes.

The AF signal forwarding scheme results in a relatively low-processing delay since baseband signal processing is not performed. In most cases, this scheme has relatively poor performance because of the increase in noise during the signal amplification. AF schemes, however, minimize latency because of the relatively low level of processing. A signal forwarded by a DF signal forwarding scheme, however, has much lower noise due to baseband processing performed to decode the signal resulting in noise cancellation. The lower noise benefit comes with the cost of increased processing delay resulting in a relatively high latency. Often, PDF signal forwarding schemes are considered to have an appropriate tradeoff between signal quality and latency relative to DF and AF schemes. For the examples herein, the incoming signal is demodulated without decoding the demodulated signal and the resulting symbols are modulated and transmitted as the forwarded signal. Since the incoming signal is not completely decoded, however, processing delays are reduced significantly compared to DF schemes.

The PDF scheme applied by the signal forwarding device 102 in the exemplary embodiments includes accumulating multiple received symbols to form a higher-order modulation symbol before retransmission. This is possible because a typical link between the signal forwarding device 102 and the base station has a relatively higher signal to noise ratio (SNR) compared to the link between the UE device and the signal forwarding device 102. In some situations, for example, BS-SFD channel 122 is generally static because both devices are fixed where the UE-SFD channel 124 is typically dynamic because the UE device is mobile.

For the example of FIG. 1B, the signal forwarding device 102 includes the SFD scheduler 109, a transmitter 128, a receiver 130, a controller 132 and an antenna 134 as well as other electronics, hardware, and code. The various functions and operations of the blocks described with reference to the signal forwarding device 102 may be implemented in any number of devices, circuits, or elements. Two or more of the functional blocks may be integrated in a single device, and the functions described as performed in any single device may be implemented over several devices. For example, the controller 132 may perform functions of the SFD scheduler 109 in some circumstances.

The controller 132 includes any combination of hardware, software, and/or firmware for executing the functions described herein as well as facilitating the overall functionality of the signal forwarding device 102. An example of a suitable controller 132 includes code running on a microprocessor or processor arrangement connected to memory.

The transmitter 128 includes electronics configured to transmit wireless signals to UE devices 108 as well as to the base station 104. In some situations, the transmitter 128 may include multiple transmitters. The receiver 130 includes electronics configured to receive wireless signals from UE devices as well as from the base station 104. In some situations, the receiver 130 may include multiple receivers. The receiver 130 and transmitter 128 receive and transmit signals, respectively, through an antenna 134. The antenna 134 may include separate transmit and receive antennas. In some circumstances, the antenna 134 may include multiple transmit and receive antennas.

The transmitter 128 and receiver 130 in the example perform radio frequency (RF) processing including modulation and demodulation in the example. The receiver 130 in the example, therefore, may include components such as low noise amplifiers (LNAs), and filters. The transmitter 130 may include filters and amplifiers. Other components may include isolators, matching circuits, and other RF components. These components in combination or cooperation with other components perform the signal forwarding functions. The required components may depend on the particular signal forwarding scheme that is employed. For the examples discussed below, the signal forwarding scheme is a PDF scheme that performs demodulation of the incoming signal without decoding and modulation and transmission of the "clean" symbols.

The transmitter 128 includes a modulator 136 and the receiver 130 includes a demodulator 138. The modulator 136 modulates the signals to be transmitted and can apply any one of a plurality of modulation orders. As is known, the modulation order determines the number of different symbols that are used to represent the transmitted data for digital modulation. There is a trade-off between modulation order, required energy and bit-error rate (BER). As the modulation order is increased, the average energy per bit must also be increased to maintain the same BER. The demodulator 138 demodulates the received signals in accordance with one of a plurality of modulation orders. For the examples and as discussed in further detail below, the SFD scheduler 109, in cooperation with the controller 132, applies coding rate information 140 received from the base station 104 and UE channel information regarding the UE-SFD channel 124 to select and set the modulation order at the modulator 136 and the demodulator 138 for the communication with the UE device 106. The modulation order for transmissions to the base station 104, however, are established by the BS scheduler 108.

The modulation order, coding rate, as well as other scheduling information is communicated to the UE device 106 using control signaling transmitted over a control channel from the signal forwarding device. For example, a Physical Downlink Control Channel (PDCCH) in accordance with LTE communication standards can provide UE-specific scheduling assignments for Downlink (DL) resource allocation, Uplink (UL) grants, PRACH (Physical Random Access Channel) responses, UL power control commands, and common scheduling assignments for signaling messages (such as system information, paging, etc.). A dashed line from the SDF scheduler 109 to the UE device 106 is shown in FIG. 1B to illustrate that the SFD scheduler 109 provides the scheduling information to the UE device 106.

The UE device 106 includes a transmitter 142 and receiver 144 for transmitting uplink signals and receiving downlink signals, respectively. The receiver 144 can receive forwarded signals from the signal forwarding device 106 and can receive downlink signals directly from the base station 104. The transmitter 142 includes an encoder 146 and a modulator 148. The encoder 146 codes the data to be transmitted to reduce errors. An example of suitable encoding technique includes using turbo coding and a cyclic redundancy check (CRC) which is an error-detecting code. Coding the data reduces errors but increases the size of the transmission. Typically, the code rate is the ratio of information bits (data) to the total number of bits that will be transmitted after encoding. For the examples discussed herein, the code rate of the encoder 146 is dynamic and is determined by the BS scheduler 108 based on the channel information 150 related from the combined channel of the UE-SFD channel 124 and the BS SFD channel 122. In one example, the channel information 150 evaluated by the BS scheduler 108 includes a retransmitted reference signal where a UE reference signal is transmitted by the UE device 106, received by the signal forwarding device 102, and retransmitted to the base station 104 as the retransmitted reference signal. The BS scheduler 108 provides the code rate to the SFD scheduler 109 which provides it to the UE device 106. The dashed arrow from the SFD scheduler 109 to the encoder 146 in FIG. 1B illustrates that the code rate is conveyed to and applied at the encoder 146. As discussed below, the signal forwarding device 102 determines, at least partially based on the code rate, other scheduling parameters that at least include the modulation order that should be applied by the modulator 148.

For the examples discussed herein, the SFD scheduler 109 is a separate and independent entity from the base station (BS) scheduler 108 although there may be some coordination between the two schedulers 108, 109. The SFD scheduler 109 and the BS scheduler 108 may be part of a single entity such as a central scheduler in some situations. As discussed herein, the SFD scheduler 109 is separate from and distinguishable from the BS scheduler 108 based on the information that is available to the two entities. The SFD scheduler 109, for example, has access to information regarding the UE-SFD channel 124 that is not available to the BS scheduler 108. In the example, the SFD scheduler 109 evaluates information allowing it to determine MIMO parameters, communication resource selection, modulation order, and transmission power for UE device transmissions. The BS scheduler 108 does not have direct access to such information and does not determine these parameters for the examples. The BS scheduler 108, however, has information regarding the entire channel from the UE device 106, through the signal forwarding device 102, to the base station 104 which allows the BS scheduler 108 to determine the appropriate code rate. As mentioned above, the SFD scheduler 109 receives coding rate information 140 from the base station 104 that is determined by the BS scheduler 108. In some situations, the BS scheduler 108 allocates a pool of communication resources from which the SFD scheduler 109 can select resources to be used for communication between the signal forwarding device 102 and the UE device 106. FIG. 1B shows a dashed arrow from the BS scheduler to the SFD scheduler 109 illustrating that some information may be provided to the SFD scheduler 109 even though the two schedulers 108, 109 are independent.

At least the receiver 130, controller 132, and transmitter 126 cooperate to perform PDF signal forwarding functions to generate the forwarded signal from the incoming signal. Generally, an incoming signal is received by the receiver 130, demodulated, modulated, and retransmitted by the transmitter 128. The PDF signal forwarding scheme used by the signal forwarding device 102, however, does not include decoding of the signal for the examples. As a result, the signal forwarding does not include decoding delays. Although both uplink signals and downlink signals can be forwarded, one scenario includes the signal forwarding device 102 forwarding uplink signals while the base station 104 transmits data directly to the UE device 106 over the UE-BS channel 126. In such situations, the base station scheduler can schedule the downlink resources over the UE-BS channel 126.

In some situations, the signal forwarding device 102 provides the base station 102 with at least some of the channel information 150. The channel information 150, however, may include any combination of channel measurements made by the signal forwarding device 102, channel measurements made by the base station 104, channel quality indicators provided by the signal forwarding device 102, and/or channel estimations.

As discussed below, the channel information 150 provided by the signal forwarding device 102 can be a retransmitted reference signal received from the UE device 106. In still other situations, the channel information 150 is a threshold indicator indicating whether the quality of channel is above a threshold. The base station 102 can also use channel estimation and evaluation techniques to evaluate the reference signal received and retransmitted by the signal forwarding device 102.

Figure 2:
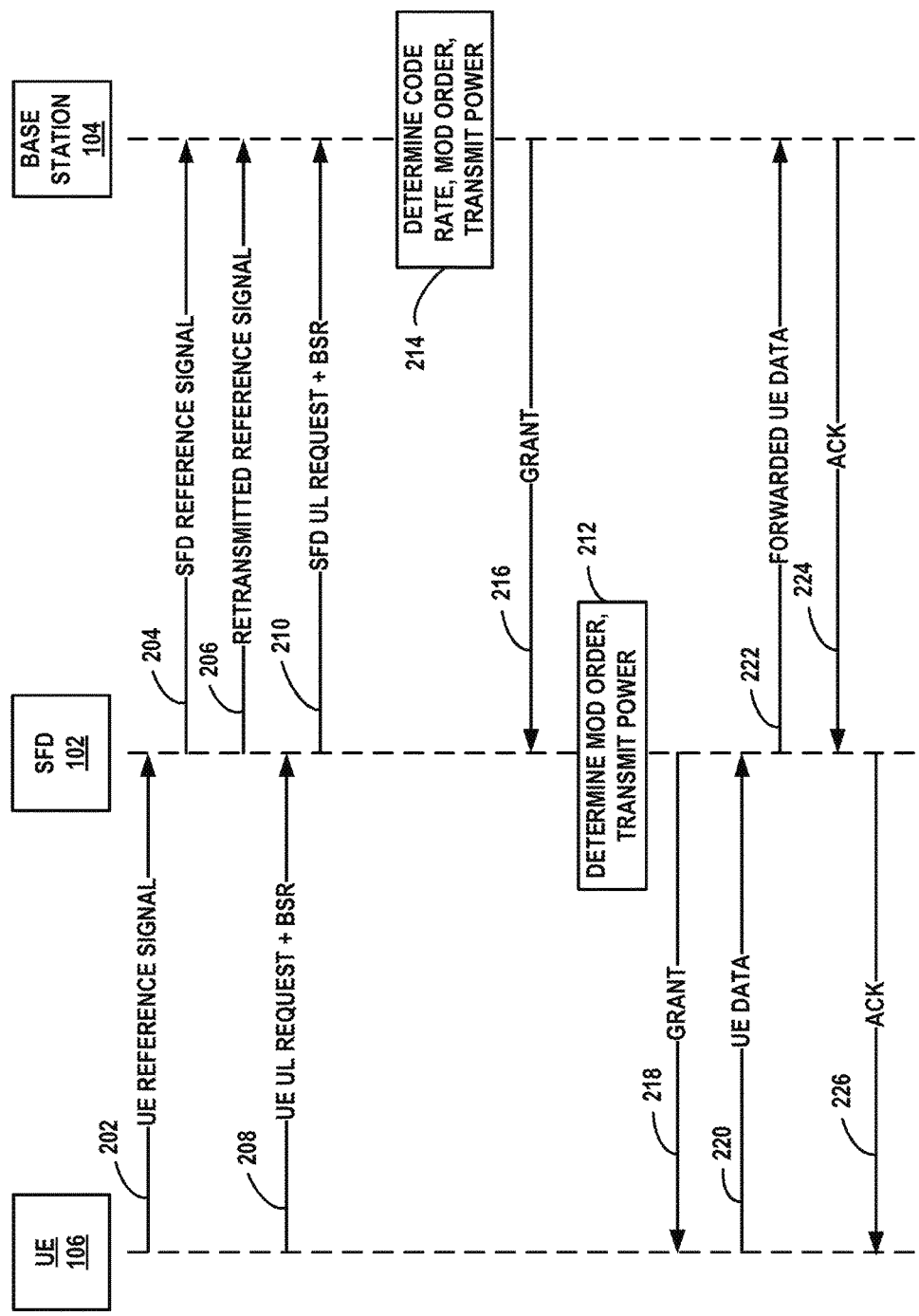
FIG. 2 is a message flow diagram between the base station 104, signal forwarding device, and the UE device for an example where a SFD scheduler that is independent from a BS scheduler schedules the UE device for which signals are forwarded.

FIG. 2 is a message flow diagram between the base station 104, signal forwarding device 102, and the UE device 106 for an example where a SFD scheduler 109 that is independent from a BS scheduler 108 schedules the UE device 106 for which signals are forwarded.

At transmission 202, the UE device 106 transmits a UE reference signal which is received by the signal forwarding device 102. The UE reference signal is transmitted through the UE-SFD channel 124 and received by the signal forwarding device 102. An example of a suitable UE reference signal is a pilot signal.

At transmission 204, the signal forwarding device 102 transmits an SFD reference signal. The SFD reference signal is transmitted through the BS-SFD channel 122 and received by the base station 104. An example of a suitable SFD reference signal is a pilot signal.

At transmission 206, the signal forwarding device 102 retransmits the UE reference signal as a retransmitted reference signal. In one example, the signal forwarding device 102 estimates the UE-SFD channel 124 and applies channel equalization to the UE reference signal when retransmitting the UE reference signal. The signal forwarding device 102, therefore, may perform basic baseband processing to equalize the channel distortion and retransmit the equalized signal to the base station. In some situations, however, channel equalization can be omitted and the UE reference signal can be retransmitted with minimal processing. The retransmitted reference signal is transmitted through the BS-SFD channel 122 and received by the base station 104.

At transmission 208, the UE device 106 transmits an uplink (UL) request message with buffer status report (BSR). In the example, the UL request is transmitted in accordance with the communication specification employed by the base station 104. The request is transmitted through the UE-SFD channel and is received by the signal forwarding device 102.

At transmission 210, the signal forwarding device forwards the uplink (UL) request message with buffer status report (BSR). The request is transmitted through the BS-SFD channel 122 and is received by the base station 104.

At event 214, the code rate, modulation order and transmit power is determined at the base station. For the examples discussed herein, the BS scheduler determines the appropriate code rate for transmissions from the UE device 106 and the signal-forwarding device 102 based at least on an evaluation of the retransmitted reference signal. Typically, the code rate is based on the characteristics (e.g., signal-to-interference-plus-noise ratio (SINR) of the channel from the UE device, through the signal forwarding device to the base station. A look up table (LUT) can be created based on simulations to determine the code rate for different SINR levels, for example. In some situations, the code rate may be determined by a combination of transport block size, the modulation and coding scheme (MCS), and the number of resource blocks. The BS scheduler 108 may consider such parameters as SINR, power headroom report (PHR) and buffer status report (BSR) to compute the MCS. Although for the example a single code rate is determined and assigned, in some situations, a plurality of code rates may be determined for different circumstances and the SFD scheduler may select the appropriate code rate from the set.

The BS scheduler 108 also determines the modulation order and the transmission power for transmissions from the signal forwarding device 102 to the base station 104. For the examples discussed herein, the modulation order is based on the code rate and the channel quality of the BS-SFD channel 122. The transmit power is determined based on the code rate, the modulation order and the path loss of the BS-SFD channel 122. In one example, look up tables (LUT) are created by running link-level simulations for a range of SINR values at different code rates and modulation orders to achieve a required quality of service (QoS) for the link budget.

In some situations, the BS scheduler 108 may take into account the data for the transmission, the current Channel Quality Indicator (CQI), and the result of the ACK/NACKs, for example. Other factors that may be considered to determine transmit power typically depend on whether there is resource coordination with neighbor cells where transmit power is otherwise be minimized.

At transmission 216, the base station 104 transmits a grant message to the signal forwarding device 102. The grant message can be transmitted in the PDCCH (or RRC messaging) and includes information including code rate information identifying the code rate to be used by the UE device 106 and the signal forwarding device 102, the modulation order to be used by signal forwarding device 102, and the transmission power level to be used by the signal forwarding device 102.

At event 212, the SFD scheduler 109 in cooperation with the controller 132 determines the modulation order and transmit power for use by the UE device. After the signal forwarding device 102 receives the grant message, the code rate information is used to determine the modulation order and the transmission power. For the examples discussed herein, the modulation order is based on the code rate and the channel quality of the UE-SFD channel 124. The transmit power is determined based on the code rate, the modulation order and the path loss of the UE-SFD channel 124. In one example, look up tables (LUT) are created by running link-level simulations for a range of SINR values at different code rates and modulation orders to achieve a required quality of service (QoS) for link budget. Typically, there is a one to many relationship between the code rate and the modulation and vice versa. For example, ⅓ code rate could be used with QPSK, 16QAM, 64-QAM and other transmissions. Each combination of code rate, modulation order, and number of resource blocks used for the data transmission determines the effective spectral efficiency of the transmission. As discussed above, other parameters can be used to determine modulation order and transmission power.

At transmission 218, the signal forwarding device sends a grant message in response to the UL request 208. The grant message includes at least the code rate, the modulation order and the transmission power to be used by the UE device 106.

At transmission 220, the UE device 106 transmits data in accordance with the scheduling parameters provided in the grant message 218. Therefore, the UE device applies the code rate, modulation order, and transmission power to the transmission of the data using the scheduled communication resources.

At transmission 222, the signal forwarding device 102 forwards the UE data to the base station 104. The signal forwarding device 102 applies the PDF signal forwarding scheme to the incoming UE signal and generates the forwarded signal. For the example, the signal forwarding device demodulates the incoming signal without decoding and modulates the resulting symbols to form the forwarded signal.

At transmission 224, the base station sends an acknowledgment (ACK) message to the signal forwarding device 102. The ACK message indicates that the forwarded UE data was successfully received. In some situations, the ACK message is a message that is forwarded on by the signal forwarding device. In other situations, it a message intended for the signal forwarding device. In still other situations, the ACK message can be an indication to both the UE device and the signal forwarding device.

Figure 3:
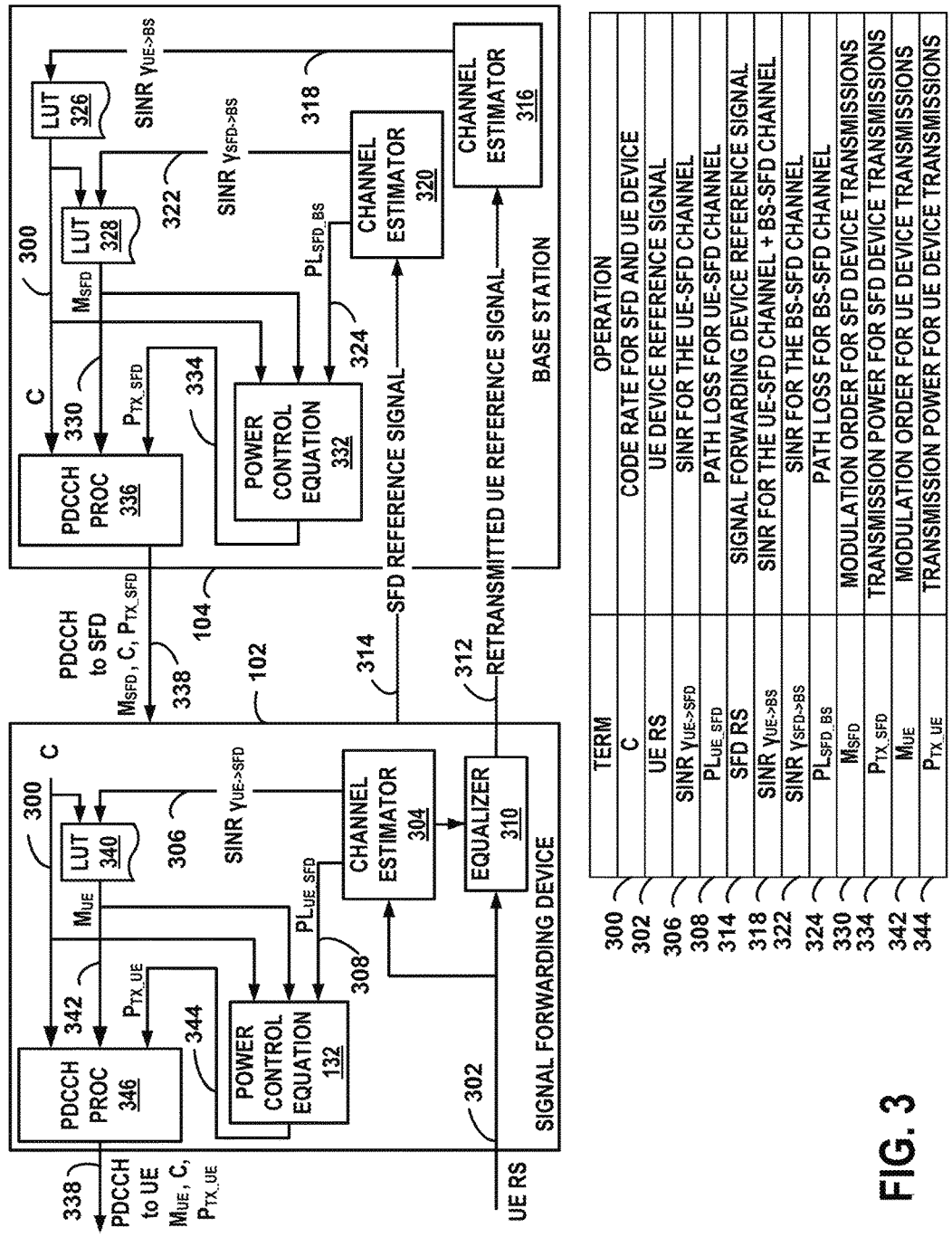
FIG. 3 is a block diagram of the signal forwarding device and the base station for an example where the code rate is determined at least partially based on a retransmitted reference signal.

At transmission 226, an acknowledgement (ACK) message is sent to the UE device 106 indicating that the data has been successfully received at the base station. In some situations, it is a forwarded ACK message that was received from the base station at the signal forwarding device 102. In other situations, it can be a message generated by the signal forwarding device 102 in response to receiving the ACK message from the base station. FIG. 3 is a block diagram of the signal forwarding device 102 and the base station 104 for an example where the code rate 300 is determined at least partially based on a retransmitted reference signal. At least some of the various components shown as part of the signal forwarding device 102 may be part of the SFD scheduler 109. At least some of the various components shown as part of the base station 104 may be part of the BS scheduler 108. For example, the power control equation solvers and the look up tables in each device can be considered to be part of the corresponding scheduler (i.e., part of SFD scheduler 109 for the signal forwarding device 102 and BS scheduler 108 for the base station 104).

The UE device transmits a UE reference signal 302 that is received by the signal forwarding device 102. The UE reference signal 302 is evaluated by a channel estimator 304 to generate the SINR $\gamma_{UE\text{->}SFD}$ 306 and the path loss ($PL_{UE\text{-}SFD}$) 308 for the UE-SFD channel 124. For the example, a channel equalizer 310 equalizes the UE reference signal based on the channel estimations of the channel estimator 304. The equalization mitigates the channel distortions caused by the UE SFD channel 124 before the UE reference signal is retransmitted as the retransmitted reference signal 312. In some situations, the channel equalizer 310 can be omitted and the UE reference signal is retransmitted with minimal processing such as filtration and amplification. For the examples discussed herein, the signal forwarding device 102 also transmits is own reference signal (SFD reference signal) 314.

Both reference signals 312, 314 and received by the base station 104 and are an example of the channel information 150 discussed with reference to FIG. 1. A channel estimator 316 evaluates the retransmitted reference signal 312 and determines a SINR level (SINR $\gamma_{UE\text{->}BS}$) 318 of the channel from the UE device through the signal forwarding device 102 to the base station 104. Accordingly, the SINR $\gamma_{UE\text{->}BS}$ 318 is the SINR of the combined resulting channel of the UE-SFD channel 124 and the BS SFD channel 122. A channel estimator 320 evaluates the SFD reference signal 314 and determines a SINR level (SINR $\gamma_{SFD\text{->}BS}$) 322 of the BS-SFD channel 122 from the signal forwarding device 102 to the base station 104. The channel estimator 320 also determines the path loss ($PL_{SFD\_BS}$) 324 of the BS-SFD channel 122 based on the SFD reference signal 314.

For the example, a look up table (LUT) 326 is used to determine the code rate (C) 300 from the SINR $\gamma_{UE\text{->}BS}$ 318. Another look up table (LUT) 328 is used to determine the modulation order ($M_{SFD}$) 330 from the SINR $\gamma_{SFD\text{->}BS}$ 322 and the code rate (C) 300. A power control equation solver 332 determines the transmission power level ($P_{TX\_SFD}$) 334 for use by the signal forwarding device 102 for UL transmission to the base station 102. The power control equation solver 332 evaluates the path loss ($PL_{SFD\_Bs}$) 324 of the BS-SFD channel 122, the modulation order ($M_{SFD}$) 330, and the code rate 300 to determine the transmission power level ($P_{RX\_SFD}$) 334 to be used by the signal forwarding device 102.

For the example, a physical downlink control channel (PDCCH) processor 336 generates a control message 338 for transmission in the PDCCH. The PDCCH message 338 includes the code rate 300, the modulation order ($M_{SFD}$) 330, and the transmission power level ($P_{TX\_SFD}$) 334. the PDCCH message 238 is transmitted through the BS-SFD channel 122 to the signal forwarding device 102.

At the signal forwarding device 102, the code rate 300, the modulation order ($M_{SFD}$) 330, and the transmission power level ($P_{TX\_SFD}$) 334 are retrieved from the PDCCH message 338. Based on the code rate 300 and the SINR $\gamma_{UE\text{->}SFD}$ 306, a look up table (LUT) 340 is used to determine the modulation order ($M_{UE}$) 342 for UE transmissions. A power control equation solver. A power control equation solver 346 determines the transmission power level ($P_{TX\text{-}UE}$) 344 for use by the UE device 106 for UL transmission. The power control equation solver 346 evaluates the path loss ($PL_{UE\_SFD}$) 308 of the UE-SFD channel 124, the modulation order ($M_{UE}$) 342, and the code rate 300 to determine the transmission power level ($P_{TX\_UE}$) 344 to be used by the UE device 106.

For the example, a physical downlink control channel (PDCCH) processor 346 generates a control message 348 for transmission in the PDCCH. The PDCCH message 348 includes the code rate 300, the modulation order ($M_{UE}$) 342, and the transmission power level ($P_{TX\_UE}$) 344. The PDCCH message 348 is transmitted through the UE-SFD channel 124 to the UE device 106.

Clearly, other embodiments and modifications of this invention will occur readily to those of ordinary skill in the art in view of these teachings. The above description is illustrative and not restrictive. This invention is to be limited only by the following claims, which include all such embodiments and modifications when viewed in conjunction with the above specification and accompanying drawings. The scope of the invention should, therefore, be determined not with reference to the above description, but instead should be determined with reference to the appended claims along with their full scope of equivalents.

The invention claimed is:

1. A signal forwarding device comprising:
   a receiver configured to receive and demodulate a received signal without decoding the received signal and configured to receive code rate information from a base station serving a user equipment (UE) device, the code rate information indicating a code rate to be used by the UE device for transmission; and
   a transmitter configured to modulate and transmit a forwarded signal based on the received signal, and to transmit, to the UE device, a scheduling control signal indicating communication resource scheduling parameters based, at least in part, on the code rate and UE channel information regarding a communication channel between the UE device and the signal forwarding device.

2. The signal forwarding device of claim 1, wherein the receiver is configured to receive the received signal from the UE device and wherein the transmitter is configured to transmit the forwarded signal to the base station.

3. The signal forwarding device of claim 1, wherein the receiver is configured to receive the received signal from the base station and wherein the transmitter is configured to transmit the forwarded signal to the UE device.

4. The signal forwarding device of claim 1, wherein the communication resource parameters comprise the code rate and a modulation order for transmission by the UE device.

5. The signal forwarding device of claim 1, wherein the communication resource parameters comprise multiple input multiple output (MIMO) parameters.

6. The signal forwarding device of claim 1, wherein the communication resource parameters comprise transmit power parameters for transmission by the UE device.

7. The signal forwarding device of claim 1, wherein the communication resource parameters identify time-frequency communication resources for transmission by the UE device.

8. The signal forwarding device of claim 1, wherein the communication resource scheduling parameters are at least partially determined by a signal forwarding device (SFD) scheduler at least partially based on the UE channel information, the SFD scheduler being independent from a base station scheduler scheduling communication resources of the UE device when the UE device is communicating directly with the base station.

9. The signal forwarding device of claim 1, wherein receiver is configured to receive a UE reference signal from the UE device and the transmitter is configured to retransmit the received UE reference signal to the base station, the code rate determined at least partially based on the retransmitted UE reference signal as received at the base station.

10. The signal forwarding device of claim 1, wherein the transmitter is further configured to transmit a signal forwarding device reference signal to the base station.

11. A communication system comprising:
    an origination device configured to transmit a data signal coded at a code rate and modulated at a modulation order;
    a signal forwarding device configured to receive the data signal through a channel, demodulate the data signal without decoding the signal to generate a demodulated signal, modulate the demodulated signal to generate a forwarded signal, and transmit the forwarded signal;
    a destination device configured to receive and decode the data signal and to transmit the code rate to the signal forwarding device, the signal forwarding device further configured to determine the modulation order and to transmit the modulation order and code rate to the origination device.

12. The communication system of claim 11, wherein the origination device is configured to transmit a reference signal through an origination device channel between the origination device and the signal forwarding device and wherein the signal forwarding device is configured to receive the reference signal and to transmit channel information pertaining to the reference signal to the destination device, the code rate at least partially based on the channel information.

13. The communication system of claim 12, wherein the channel information comprises a retransmitted reference signal which is a retransmission of the reference signal.

14. The communication system of claim 11, wherein the signal forwarding device is configured to determine the modulation order further based on a quality of the channel.

15. The communication system of claim 11, further comprising a destination device scheduler connected to the destination device, the code rate determined based at least partially on a quality of an origination to destination channel from the origination device, through the signal forwarding device, to the destination device.

16. The communication system of claim 11, further comprising a signal forwarding device (SFD) scheduler further configured to determine scheduling parameters for transmissions by the origination device, the scheduling parameters determined at least partially based on the code rate and a quality of the channel.

17. The communication system of claim 16, wherein the scheduling parameters comprise parameters identifying time-frequency communication resources.

18. The communication system of claim 16, wherein the scheduling parameters comprise parameters identifying transmission power.

19. The communication system of claim 16, wherein the scheduling parameters comprise multiple input multiple output (MIMO) parameters.

* * * * *